March 5, 1957 W. W. CARNELL 2,783,654
OIL BATH AND POWER TRANSFER CHAIN CASE
Filed Dec. 28, 1953 2 Sheets-Sheet 1

INVENTOR
Woodrow W. Carnell
BY
ATTORNEY

March 5, 1957 W. W. CARNELL 2,783,654
OIL BATH AND POWER TRANSFER CHAIN CASE
Filed Dec. 28, 1953 2 Sheets-Sheet 2

INVENTOR
Woodrow W. Carnell
BY *Gustave Miller*
ATTORNEY

United States Patent Office 2,783,654
Patented Mar. 5, 1957

2,783,654
OIL BATH AND POWER TRANSFER CHAIN CASE

Woodrow W. Carnell, Natchez, Miss.

Application December 28, 1953, Serial No. 400,475

1 Claim. (Cl. 74—216.5)

The present invention relates generally to a transmission device and specifically to a device and cover for transmitting power from an auto truck engine or transmission to a power winch mounted on the truck body.

Winches, when mounted on trucks, such a road wreckers and the like, are generally mounted with the input shaft of the winch above the truck frame and directly behind the cab. It is customary to transmit the power from the engine or transmission to this winch by means of a roller chain and two roller chain sprockets. One sprocket is mounted on the input shaft of the winch and the other is mounted on a shaft customarily supported by two pillow block bearings. In the past these bearings have been supported on some angle iron or block welded either to the winch or to the truck frame.

Due to the limitations of space and the difficulty in placing the winch in alignment with the source of power, the mis-alignment resulting is damaging to the chain and drive for much wear is experienced.

The present invention has as its principal object to provide a transfer case and power drive which is easily positioned within a wide range of angles between the power source and the input shaft of the winch. Another object of the invention is to provide such a transfer case in which the action of the enclosed oil may be readily seen.

A still further object of the invention is to provide a transfer case which is readily attached to the frame of the truck and to the case of the winch.

Another object of the invention is to provide a simply constructed and inexpensive transfer case and drive which may be attached to the case of the winch without serious change in any part of the winch.

A still further object is to provide an easy tension adjustment on the chain drive.

Briefly described, the invention is a formed metal case having an adjustable bearing mounted at its lower end, a hand hole at its upper end through which the chain may be positioned and which latter is covered with the Plexiglas window for inspection purposes. The transmission case may be mounted on the input shaft of a winch with only a minor change to the winch body, and when so positioned may be swung into alignment with the transmission output of the truck engine and then bolted to the frame of the truck by holes drilled as it is in alignment.

These and other advantages of the invention will be understood from the following description when taken in connection with the annexed drawings in which.

Figure 1:
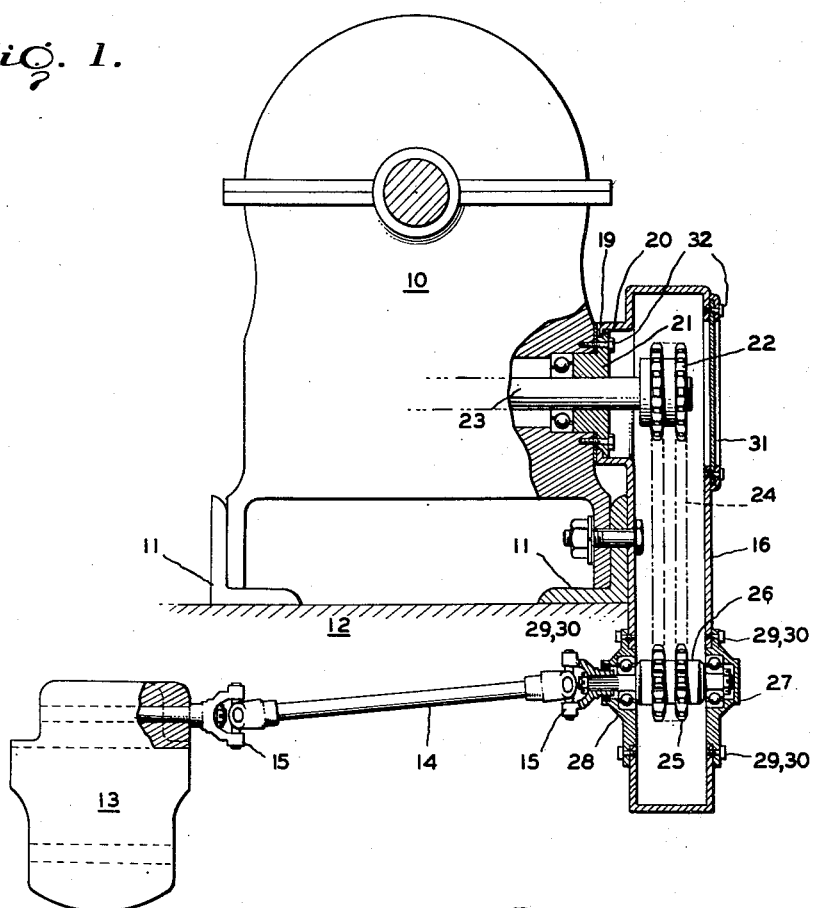
Fig. 1 is a view in elevation showing the invention in sectional view.
Figure 2:
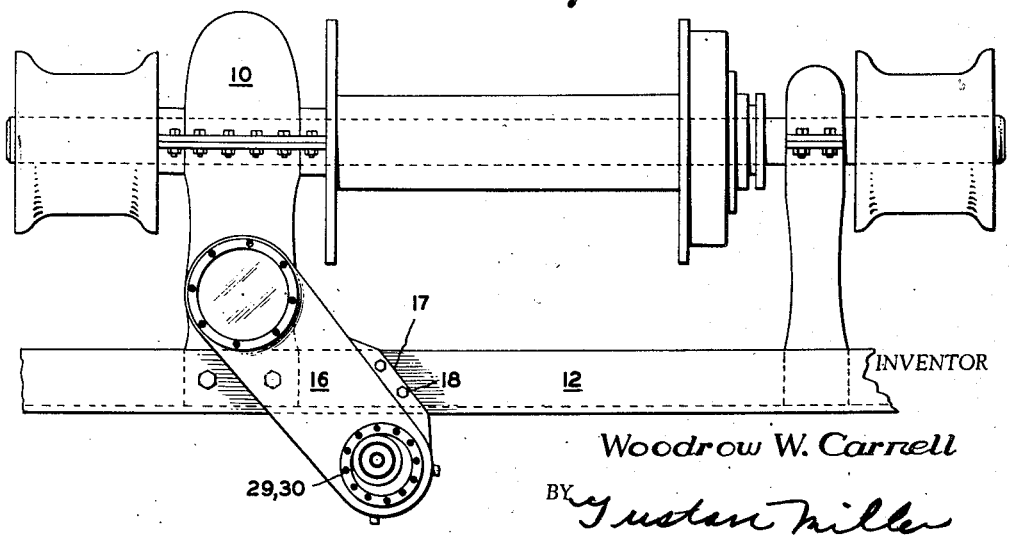
Fig. 2 is an end view showing the location of the invention on the case of winch and secured to the truck frame.

Referring in more particular to the drawing in Fig. 1, winch case 10 is seen secured by angle irons 11 to the truck part of frame 12. The transmission body 13 of the truck is shown positioned below and rearward of the winch. A conventional drive shaft 14 having universal joints 15 connects the truck transmission to this invention which has case 16 of formed sheet metal or other suitable material secured at its upper end by a flange 19, which is held to the winch case 10 by lip 20 of the bearing block 21. This lip 20 is the only change made in the conventional winch but other means of securing the case 16 to the bearing block 21 may be used. Case 16 has a flange 17, as shown in Figs. 2 and 3 and holes 18 therein are suitably spaced to secure it to frame 12.

Figure 3:
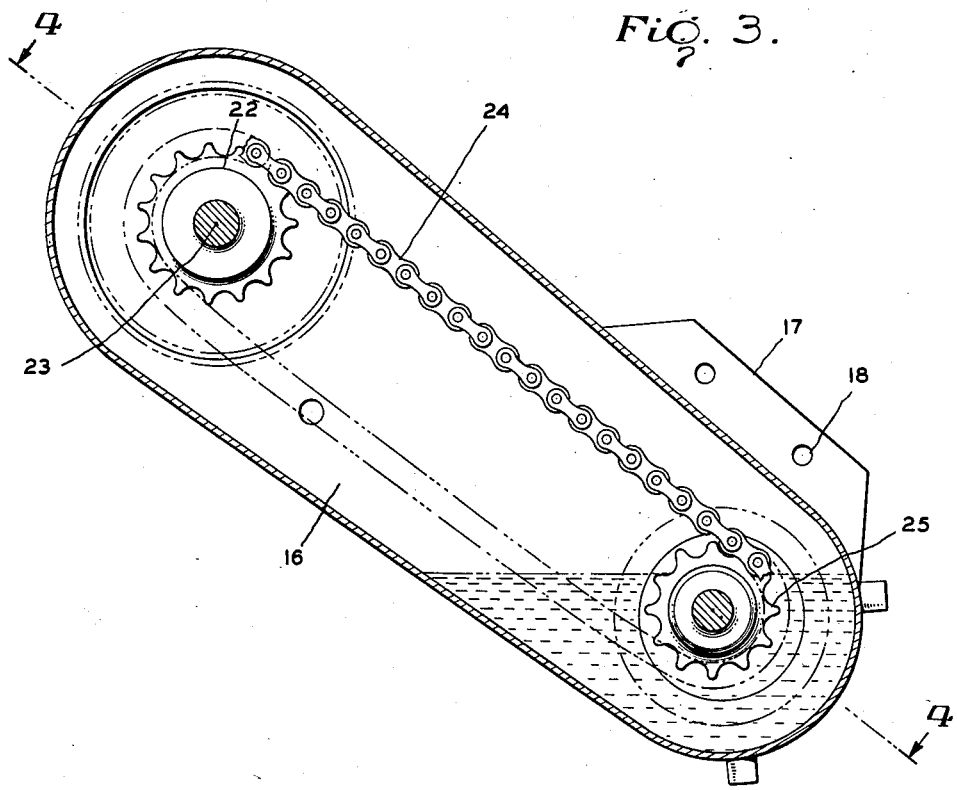
Fig. 3 is a side view, partly in section.
Figure 4:
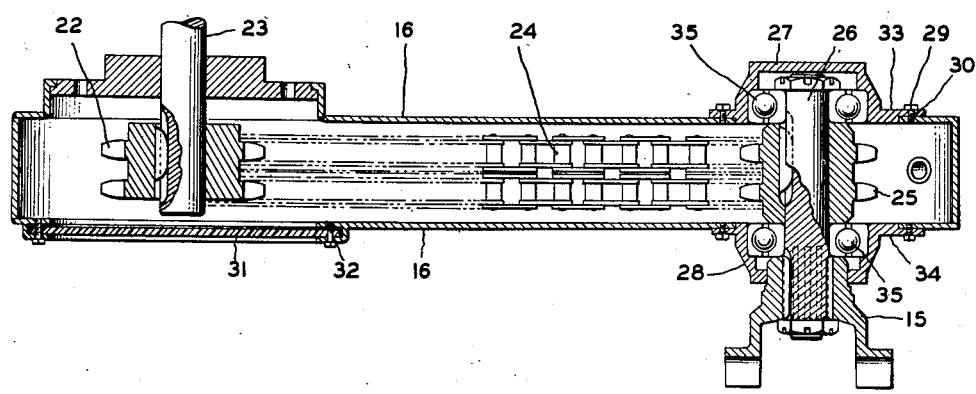
Fig. 4 is a top view in action taken on line 4—4 of Fig. 3.

As seen in Figs. 1, 3 and 4, a sprocket 22 of conventional design is secured to the input shaft 23 of the winch 10. Chain 24 traverses sprocket 22 and also sprocket 25 at the lower end of case 16, which sprocket is mounted on shaft 26, pinioned bearings 35 in pillow blocks 27 and 28. It will be seen in Figs. 2 and 4 that the pillow blocks 27 and 28 have non-concentric flanges 33 and 34 with bolts and bolt holes 29 and 30. Within the pillow blocks 27 and 28 are conventional ball bearings 35. At the upper end of case 16 a transparent window 31 of Plexiglas or other suitable material is secured in conventional fashion by screws 32.

In operation, sprocket gears 22 are attached to the input shaft 23 and the case 16 mounted thereover and with a suitable tool the chain can be lifted through the opening later to be covered by the window 31. The adjustment of the case 16 relative to the winch 10 may be made before the bolts 32 are tightened to secure flange 20 under lip 21. Thusly, the alignment of the drive shaft 14 may be made as close as possible before holes 18 are drilled through flange 17 and the frame 12 of the truck. Tightening of the chain drive is made possible by turning the pillow blocks 27 and 28 and re-setting holes 29 in holes 30.

Although a single embodiment of the invention has been described and illustrated, many modifications and changes may be made and are contemplated without departing from the spirit and scope of the invention, as hereinafter claimed.

I claim:

In combination with a truck engine power transmission and winch mounted on the truck body, an oil bath and power transfer chain case comprising a substantially oval body mounted on the truck body, means at one end of the chain case defining a circular opening and flange thereto through which the input power shaft to the winch extends from a chain sprocket within said chain case, a hand hole on the front of said chain case opposite said opening and flange and coaxial therewith, a transparent cover for said hand hole, a pair of pillow bearing blocks mounted in oppositely disposed openings at the other end of said chain case, means for adjusting said pillow bearing blocks within said openings comprising an eccentric flange on each of said pair of blocks and stud bolt means for securing said blocks in adjusted position on said chain case, a power drive shaft powered by said transmission and journaled in said pair of pillow bearing blocks, a chain sprocket fixed on said power drive shaft, and a sprocket chain within said chain case entrained on both said sprockets for transferring power from said power drive shaft to said input power shaft to the winch.

References Cited in the file of this patent
UNITED STATES PATENTS

| | | |
|---|---|---|
| 1,938,723 | Ritz | Dec. 12, 1933 |
| 2,348,843 | Pearce | May 16, 1944 |
| 2,427,470 | Morton et al. | Sept. 16, 1947 |
| 2,479,617 | Hawley | Aug. 23, 1949 |
| 2,621,530 | Siegerist | Dec. 16, 1952 |
| 2,675,709 | Dowdy | Apr. 20, 1954 |